US006254992B1

(12) United States Patent
Kato

(10) Patent No.: US 6,254,992 B1
(45) Date of Patent: Jul. 3, 2001

(54) SUPPORT FOR RECORDING SHEET

(75) Inventor: Shinji Kato, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/659,608

(22) Filed: Sep. 11, 2000

(30) Foreign Application Priority Data

Sep. 14, 1999 (JP) ................................................ 11-259960

(51) Int. Cl.[7] .............................. G03C 1/79; C09C 1/36; B32B 15/02; B32B 17/02; B32B 23/08

(52) U.S. Cl. ......................... 428/405; 428/407; 428/447; 428/511; 428/513; 430/510; 430/523; 430/536; 430/538; 106/443

(58) Field of Search .................................... 430/538, 523, 430/510, 536; 428/405, 407, 447, 511, 513; 103/443

(56) References Cited

U.S. PATENT DOCUMENTS 3,501,298 3/1970 Crawford ................................ 96/85
5,820,977 * 10/1998 Shirakura et al. .................. 428/328

FOREIGN PATENT DOCUMENTS 0 327 768 A2 8/1989 (EP) ................................ G03C/1/00
0 757 284 A1 2/1997 (EP) ................................ G03C/1/79
1 400 378 9/1965 (FR) .
2 042 573 9/1980 (GB) ............................... C09C/1/36
10-307367 11/1998 (JP) ................................ G03C/1/91

* cited by examiner

*Primary Examiner*—Richard L. Schilling
(74) *Attorney, Agent, or Firm*—Sughrue, Mion, Zinn, Macpeak & Seas, PLLC

(57) ABSTRACT

A support for recording sheet in which there is no film cracking, the occurrence of die-lip stripes is inhibited, and which has excellent image sharpness and has excellent light fading resistance. The support for recording sheet is provided with a substrate having an image printing side and another side opposite the image printing side, a water resistant resin coating layer provided on each side of the substrate, at least the resin coating layer provided on the image printing side containing a titanium dioxide pigment, the titanium dioxide pigment including a titanium dioxide having a particulate surface treated by a silane coupling agent and aluminum phosphate in an aqueous slurry state, with a treatment amount of the aluminum phosphate with respect to the titanium dioxide being from 0.05 wt % to 1.2 wt %.

8 Claims, No Drawings

SUPPORT FOR RECORDING SHEET

BACKGROUND OF THE INVENTION

1. Field of the Invention

The present invention relates to a support for recording sheet. More specifically, the present invention relates to a support for recording sheet which is provided with a substrate having disposed on both sides thereof a coating layer of a water-resistant resin, which support for recording sheet has excellent image sharpness (resolution) and excellent image light-fading resistance.

2. Description of the Related Art

Conventionally, support for recording sheets coated with a resin on both sides, such as photographic printing paper, thermographic paper, full color thermographic paper, and the like have been known. In particular, titanium dioxide, pigments, blueing agents (including blue pigments), fluorescent brighteners, and the like have been included in the coating layer of the paper used for photographic printing paper (U.S. Pat. No. 3,501,298).

The titanium dioxide used in this case has an effect of heightening the efficiency of light reflectance, and it is known that the more the content of the titanium dioxide is increased, the more image resolution is improved.

At the time a coating layer of a water-resistant resin is formed, the water-resistant resin which contains titanium dioxide is melted and extruded in the form of film from a slit die for a short period of time. However, when the titanium dioxide is incorporated in the resin coating in an amount of 20 wt % or more and the molten extrusion is conducted at a discharge temperature of 290° C. to 350° C., as has conventionally been the case, cracks (hereinafter referred to as "film cracking") are caused in the coating layer of the water-resistant resin, and stripes (hereinafter referred to as "die-lip stripes") are easily generated at the die-lip portion of the extruder.

When such film cracking occurs, the external appearance of the product not only deteriorates, but also, the product is deprived of its commercial value due to the loss of its water-resistant capability. Further, when die-lip stripes are generated, consecutive stripes are formed in the longitudinal direction on the surface of the manufactured film or laminate. Therefore, not only does the external appearance of the product deteriorate remarkably, but even during secondary processing such as drawing, the transparency of the film is non-uniform, and thus the commercial value of the product is lowered considerably.

In order to overcome such drawbacks, as the applicants of Japanese Patent Application Laid-Open (JP-A) No. 10-307367 have already noted and disclosed, by using a titanium dioxide pigment in which the particle surface of the titanium dioxide to be used has been subjected to a wet-process silane coupling agent coating treatment, the titanium dioxide pigment can easily be incorporated in an amount of 20 wt % or more in a polyolefine resin layer. Therefore, even when the water-resistant resin is extrusion molded at a melting temperature of around 325° C., there are no occurrences of film cracking, die-lip stripes and the like.

The present inventors examined in detail the aforementioned high-resolution support for recording sheet. It was found that with the silane coupling agent coating treatment, although the titanium dioxide can be melted and extruded at a high temperature, the generation of die-lip stripes cannot be controlled completely since the activity of the titanium dioxide is not inhibited. It was also noted that there is a tendency for the light fading resistance of the print surface of the support for recording sheet to deteriorate.

Further, JP-A No. 10-307367 discloses that by surface treating the titanium dioxide with $Al_2O_3$, aggregation of the titanium dioxide pigment at the time of lamination is prevented. However, when the $Al_2O_3$ treatment is used, effects with regard to high filling capability and fading resistance remain insufficient.

SUMMARY OF THE INVENTION

As a result of their extensive studies to produce a high-resolution support for recording sheet in which light fading resistance is not harmed and the occurrence of die-lip stripes is inhibited, the present inventors devised the present invention. Although the mechanism resulting in the working of the present invention is not altogether clear, it was found that by using a titanium dioxide pigment whose particle surface has been subjected to a wet-process coating treatment with a silane coupling agent and aluminum phosphate in an amount of 0.05 to 1.2 wt %, the titanium dioxide pigment can easily be incorporated in an amount of 20% by weight or more in a polyolefine resin layer without hindering the production of the titanium dioxide pigment. Therefore, even when the titanium dioxide is extrusion molded at a melting temperature of around 325° C., there is no film cracking, the generation of die-lip stripes is inhibited, and excellent light-fading resistance is preserved.

In accordance with an aspect of the present invention, a support for recording sheet comprising: (a) a substrate having an image printing side and another side opposite the image printing side; (b) a water resistant resin coating layer provided on each side of the substrate, at least the resin coating layer provided on the image printing side containing a titanium dioxide pigment, the titanium dioxide pigment including a titanium dioxide having a particulate surface treated by a silane coupling agent and aluminum phosphate in an aqueous slurry state, with a treatment amount of the aluminum phosphate with respect to the titanium dioxide being from 0.05 wt % to 1.2 wt %.

DESCRIPTION OF THE PREFERRED EMBODIMENTS

A detailed description of a support for recording sheet and a manufacturing method thereof will be given hereinafter. In the present invention, a layer for coating the surface of a substrate can be a single layer structure, or a multilayer structure formed by two or three layers.

A water-resistant resin for forming a coating layer in the present invention can be appropriately selected from resins which can be molten and extruded at a temperature of 170° C. to 345 ° C. However, ordinarily, a polyolefine resin such as polyethylene or polypropylene is used.

The polyethylene may be high density polyethylene (HDPE), low density polyethylene (LDPE), linear low density polyethylene (L-LDPE), or the like. However, when the rigidity of a support for a photographic printing paper is considered to be important, polypropylene, high density polyethylene (HDPE), linear low density polyethylene (L-LDPE), or the like is preferably used.

These resins can be used solely, or two or more thereof can be used in combination. In the present invention, from the standpoint of improving image quality, titanium dioxide is contained in at least one layer of a water-resistant resin coating layer at the side at which an image is formed, and a blueing agent, a fluorescent brightener, or the like is preferably contained therein. The amount of titanium dioxide which is contained in at least one layer of a water-resistant resin coating layer can also be 13 wt % or more, or 20 wt % or more. From the standpoint of improving adhesiveness between the water-resistant resin coating layer and substrate, a tackifier resin, an adhesive resin, or the like can be included in the lowermost layer of the water-resistant resin coating layer which comes into contact with the substrate. Further, in accordance with the intended use of the support for recording sheet, an antioxidant, a release agent, a hollow polymer, or the like can be appropriately contained.

The form of the titanium dioxide pigment used in the present invention can be either anatase-type or rutile-type. However, when the degree of whiteness is considered to be important, an anatase-type titanium dioxide pigment is preferably used. When sharpness is considered to be important, a rutile-type titanium dioxide pigment is preferably used. Further, in consideration of both the degree of whiteness and sharpness, an anatase-type titanium dioxide pigment and the rutile-type titanium dioxide pigment can be used in combination. Alternately, a layer containing titanium dioxide may be divided into two layers, and an anatase-type titanium dioxide may be added to one layer while a rutile-type titanium dioxide is added to the other layer.

A mean particle diameter of the titanium dioxide pigment is preferably 0.1 to 0.4 $\mu$m. When the mean particle diameter is less than 0.1 $\mu$m, it becomes difficult to uniformly mix and disperse the titanium dioxide pigment in the resin coating layer. Conversely, when the mean particle diameter of the titanium dioxide pigment exceeds 0.4 $\mu$m, a sufficient degree of whiteness cannot be obtained and protrusions are generated on the coating surface, thus exerting an adverse effect on image quality.

The titanium dioxide pigment used in the present invention is a titanium dioxide pigment in which the particle surface of titanium dioxide has been subjected to a coating process with a silane coupling agent. Most preferably, the particle surface of titanium dioxide is subjected to a wet-process treatment with a silane coupling agent and an aluminum phosphate while in a state of aqueous slurry during the process of producing the titanium dioxide.

In the process of producing the titanium dioxide, the mean particle size of the titanium dioxide is 0.10 to 0.40 $\mu$m, and an aqueous slurry of 100 to 500/1 is prepared. After the slurry is maintained at a temperature of 20° C. to 60° C., aluminum phosphate is added and titanium dioxide is treated by aluminum phosphate. Further, the slurry is adjusted to a pH of 2 to 6, the silane coupling agent is added, and the resultant mixture is hydrolyzed.

After the slurry is heated to a temperature of about 60° C. to 90° C., the slurry is further stirred, filtered, and washed. The obtained cake of titanium dioxide is then dried for about 2 to 36 hours at a temperature of 100° C. to 140° C., and ground by a grinding means so that the titanium dioxide pigment can be obtained.

Methods for applying the silane coupling agent onto the surface of the titanium dioxide generally include the following. There is a dry-process method in which the silane coupling agent is mixed with the titanium dioxide using a high-speed mixer such as a Henschel mixer, a jet mill, or the like. There is a method in which the silane coupling agent and titanium dioxide are kneaded into a thermoplastic resin (a water-resistant resin) such as polyethylene in advance. There is also a method in which the silane coupling agent is added to a composition of titanium dioxide and a thermoplastic resin (a water-resistant resin) at the same time that this composition is being mixed by a kneader to be described later. Further, the silane coupling agent is sometimes mixed with a solvent such as alcohol and used. However, in methods other than a wet-process treatment, it is difficult to completely remove excessive amounts of the silane coupling agent or the like which did not react with the surface of titanium dioxide. For this reason, when the water-resistant resin containing titanium dioxide which was treated by the silane coupling agent is used for extrusion lamination, there are drawbacks in that residue of the silane coupling agent leads to quality deficiency referred to as "gel", and film cracking occurs when the residue is volatilized.

It is preferable that the silane coupling agent is a silane coupling agent whose terminal end has an ethoxy group or a methoxy group. In particular, it is desirable that the silane coupling agent is at least one type of silane coupling agent selected from the compounds represented by the following formula (1).

Formula (1)

$$(R^1)_n\text{—Si}(OR^2)_{4-n} \qquad (1)$$

wherein, $R^1$ is a hydrocarbon group containing at least one of an alkyl group, a vinyl group, and a methacryl group and which has no more than 10 carbons, $R^2$ is a methyl group or an ethyl group, n is an integer of 1 to 3, and if $n \geqq 2$, so that there is a plurality of $R^1$, each $R^1$ can be the same or different.

When $R^1$ in formula (1) has more than 10 carbons, treatment with the silane coupling agent in the wet-process becomes difficult since the hydrolysis speed of the silane coupling agent itself is slow. Further, when $R^1$ in formula (1) has more than 10 carbons, there is the drawback that the particles themselves of the titanium dioxide which is treated by the silane coupling agent turn yellow. The smaller n in formula (1) is, the faster the hydrolysis speed of the silane coupling agent in the wet-process becomes.

A treatment amount of the silane coupling agent with respect to titanium dioxide is preferably 0.05 to 3.0 wt %, and more preferably 0.5 to 2.0 wt %. When the treatment amount becomes less than 0.05 wt %, surface treatment effects by the silane coupling agent cannot be obtained. Further, when the treatment amount exceeds 0.3 wt %, the treatment becomes excessive with respect to titanium dioxide, and it therefore becomes difficult to incorporate the titanium dioxide pigment in an amount of 20 wt % or more in the molten polyolefine. Moreover, there is the possibility that the silane coupling agents will react with each other and appear in the molten polyolefine as fine gel, leading to a noticeable deterioration of suitability of a surface of the support.

In order to inhibit the activity of the titanium dioxide pigment, the titanium dioxide surface may be surface treated with aluminum phosphate when the silane coupling agent surface treatment is carried out. The treatment amount of aluminum phosphate with respect to titanium dioxide is 0.05 to 1.2 wt %, and preferably 0.1 to 0.8 wt %.

When the treatment amount of aluminum phosphate with respect to titanium dioxide exceeds 1.2 wt %, film cracking and die-lip stripes occur more easily during extrusion and lamination of a water-resistance resin-compound containing a titanium dioxide pigment in an amount of 20 wt % or more.

On the other hand, when the treatment amount of aluminum phosphate with respect to titanium dioxide is less than 0.05 wt %, film cracking does not occur during extrusion and lamination even if the percentage content of the titanium dioxide pigment within the resin compound is raised to 20 wt % or more. However, there is the problem that die-lip stripes, which are thought to result from the activity of the titanium dioxide not being inhibited, become easily generated. At the same time, a fading phenomenon in the laminated layer due to light is also easily generated.

The titanium dioxide pigment uses a higher fatty acid metallic salt, a higher fatty acid ethyl, a higher fatty acid amide, a higher fatty acid, a polyolefine wax, or the like, as a dispersion aid, and is kneaded into the water-resistant resin by a kneading machine such as a two-roll, a three-roll, a kneader, a Banburry mixer, or a continuous kneader (such as a stone grist mill-type, a planet-type, a roll-type, or an internal mixer-type). The obtained water-resistant resin containing titanium dioxide is formed in a pellet shape, and used as a master batch which contains the titanium dioxide pigment. In particular, metallic stearate is preferably used as the dispersion aid, and more preferably, zinc stearate is used.

The density of the titanium dioxide pigment in the pellet is preferably about 30 to 75 wt %. Generally, the density of the dispersion aid is preferably about 0.5 to 10 wt %. When the density of the titanium dioxide pigment is less than 30 wt %, it becomes necessary to increase the amounts of pellets used when the water-resistant resin layer is formed. Conversely, when the density is more than 75 wt %, the dispersibility of the titanium dioxide pigment deteriorates, and the pellets easily crack. Further, the master batch which contains the titanium dioxide pigment is preferably dried or vacuum-dried for two hours or more at a temperature of 50° C. to 90° C. before use.

A blueing agent can be included in the water-resistant resin coating layer. Examples of the blueing agent include ultramarine blue, cobalt blue, cobalt oxide phosphate, a quinacridone-based pigment, and the like, and mixtures thereof. The particle diameter of the blueing agent is not particularly limited, but, ordinarily, is preferably 0.3 to 10 μm.

The blueing agent in the multilayer water-resistant resin coating layer of the present invention is preferably incorporated in an amount of 0.2 to 0.4 wt % when used in the uppermost layer, and incorporated in an amount of 0 to 0.15 wt % when used in the lowermost layer.

The blueing agent is incorporated in the water-resistant resin by a kneader such as a two-roll, a three-roll, a kneader, a Banburry mixer, or a continuous kneader (such as a stone grist mill-type, a planet-type, a roll-type, or an internal mixer). The obtained water-resistant resin containing the blueing agent is formed in a pellet shape and used as a master batch which contains the blueing agent.

The density of the blueing agent in the pellet is preferably about 1 to 30 wt %. The titanium dioxide pigment may be kneaded together into the pellet when the pellet of the blueing agent is formed. Further, in order to aid dispersion of the blueing agent, a dispersion aid such as a low molecular weight water-resistant resin, a polyolefine wax, a higher fatty acid metallic salt, an ester of higher fatty acid, a higher fatty acid amide, or a higher fatty acid can be used.

An antioxidant may be incorporated in the water-resistant resin coating layer of the present invention. The content of the antioxidant with respect to the amount of the water-resistant resin is preferably about 50 to 1,000 ppm.

A water-resistant resin used in the present invention can be used by heating and melting a pellet which contains the aforementioned titanium dioxide pigment and by the pellet being diluted with the water-resistance resin as needed. Further, the pellet which contains the titanium dioxide pigment can be used together with a pellet which contains the blueing agent as needed. Then, the single or multi-layer water-resistant resin coating layer in the present invention is formed on a substrate such as paper or synthetic paper by laminating the obtained water-resistant resin by a method such as an ordinary laminating method, a serial laminating method, or a laminating method which uses a single or multi-layer extruding die such as a feet-block type, a multi-manifold type, or a multi-slot type. The shape of the single or multi-layer extruding die is not particularly limited. However, generally a T die, a coat hanger die, or the like is preferably used.

Before the resin is coated on the substrate, the substrate is preferably subjected to an activation treatment such as a corona discharging treatment, a frame treatment, a glow discharging treatment, or a plasma treatment.

When the water-resistant resin coating layer of the present invention is formed by, for example, three layers, the thickness of the uppermost layer is preferably 0.5 to 50 μm, that of the intermediate layer is preferably 5 to 50 μm, and that of the lowermost layer is preferably 0.5 to 50 μm.

The outermost layer of the water-resistant resin coating layer at the side at which an image is formed may have a glossy surface, a fine surface described in Japanese Patent Application Laid-Open (JP-A) No. 55-26507, a matte surface, or a silky surface, and the reverse layer thereof may have a non-glossy surface. These surfaces can be made by using a roll or the like which has, for example, the glossy surface, the fine surface, the matte surface, or the silky surface. An activation treatment such as corona discharging treatment, frame treatment, or the like can be applied to the top surface after formation. Further, after the activation treatment, an undercoating treatment can be applied.

Examples of the substrate used in the present invention include: a natural pulp paper having ordinary natural pulp as a main component; a mixed paper of natural pulp and synthetic fiber; a synthetic fiber paper having synthetic fiber as a main component; a so-called synthetic paper in which a synthetic resin film such as polyethylene, polyethylene terephthalate, or polypropylene has been formed like paper. However, as a substrate for photographic printing paper, use of natural pulp paper (simply referred to as base paper hereinafter) is particularly preferable.

Examples of chemicals which may be added to the base paper include: an alkyl ketene dimer, a filling agent such as clay, talc, calcium carbonate, or an urea resin particulate; a sizing agent such as rosin, a higher fatty acid salt, a paraffin wax, or alkenyl succinic acid; a paper stiffener such as polyacrylamide; and a fixer such as aluminum sulfate. In addition, a dye, a fluorescent dye, a slime control agent, or a defoaming agent may be added as needed.

The following softening agents can be added to the base paper as needed.

A reference to softening agents can be found, for example, on pages 554 to 555 of the "Shin Shi Kako Binran" ("The New Paper Processing Handbook") (edited by Shiyaku Time, published in 1980). In particular, a softening agent having a molecular weight of 200 or higher is preferable. The softening agent has a hydrophobic group having 10 carbons or more, and is an amine salt or a quaternary ammonium salt which is self-fixed to cellulose.

Specific examples of the softening agent include: a reaction product of a maleic anhydride copolymer and polyalkylenepolyamine; a reaction product of a higher fatty acid and polyalkylenepolyamine; a reaction product of urethane alcohol and an alkylating agent; a quaternary ammonium salt of the higher fatty acid; and the like. However, the reaction product of the maleic anhydride copolymer and polyalkylenepolyamine, and the reaction product of urethane alcohol and the alkylating agent are particularly preferable.

The pulp surface can be subjected to a surface sizing treatment by use of a film-forming polymer such as gelatin, starch, carboxy methyl cellulose, polyacrylamide, polyvinyl alcohol, or a degenerated product of polyvinyl alcohol. Examples of the degenerated product of polyvinyl alcohol in this case include a degenerated product into which a carboxyl group has been introduced, a copolymer of a degenerated product into which silanol has been introduced and acrylamide, and the like. The coating amount of the film-forming polymer is 0.1 to 5.0 g/$m^2$, and preferably 0.5 to 2.0 g/$m^2$.

An antistatic agent, a fluorescent brightener, a pigment, a defoaming agent, or the like can be added to the aforementioned film-forming polymer as needed.

The base paper is manufactured according to the following. The aforementioned pulp and the pulp slurry, to which additives such as the filler, the sizing agent, the paper stiffener, or the fixer have been added as needed, are made into paper by a paper machine such as a long mesh paper machine, then dried and taken up. The aforementioned surface sizing treatment is performed either before or after the drying. Further, a calendering treatment is performed between drying and taking-up.

When the surface sizing treatment is carried out after drying, the calendering treatment can be carried out either before or after the surface sizing treatment. However, it is preferable to carry out the calendering treatment as the final finishing process after various treatments have been carried out. Known metal rolls and resilient rolls used in the manufacture of ordinary paper are used in the calendering treatment.

The base paper used in the support for recording sheet of the present invention is finally prepared by the calendering treatment so as to have a thickness of 50 to 250 $\mu$m. The density of the base paper is 0.8 to 1.3 g/$m^3$, and preferably 1.0 to 1.2 g/$m^3$.

In order to prevent electrostatic charge, curling, and the like, various back coating layers can be coated on the support for recording sheet of the present invention. Further, the back coating layer can contain appropriate combinations of inorganic antistatic agents, organic antistatic agents, hydrophilic binders, latices, hardening agents, pigments, surfactants, and the like which are disclosed or exemplified in Japanese Patent Application Publication (JP-B) Nos. 52-18020, 57-9059, 57-53940, 58-56859, 59-214849, 58-184144, and the like.

The support for recording sheet in the present invention, being coated with various photographic structuring layers, is used for a color photographic printing paper, a monochrome printing paper, a photocomposing printing paper, a reversal photographic material, a negative or positive image receiving layer of a silver salt diffusion transfer process, or, being coated with a multicolor heat-sensitive layer and an image receiving layer of various inks and pigments, is used for a color heat-sensitive material, an ink jet sheet, a heat-sensitive transfer sheet, a color Xerox, or the like.

The present invention will next be described by way of Examples, which should not be construed as limiting the invention.

The silane coupling agents in the Examples are as follows. n, $R^1$, and $R^2$ are defined by the same definitions of n, $R^1$, and $R^2$ of formula (1).

TABLE 1

| silane coupling agent | n | $R^1$ | $R^2$ |
|---|---|---|---|
| A | 1 | $CH_3(CH_2)_5$ | $CH_3$ |
| B | 2 | $CH_3(CH_2)_4$ | $CH_3$ |
| C | 1 | $CH_3$ | $CH_3$ |
| D | 1 | $C_2H_5$ | $CH_3$ |

EXAMPLES

Example 1

Using a cooling roll having a surface matte roughness of 10 $\mu$m, a single layer of polyethylene resin of the composition indicated in Table 2 below was extruded at a molten discharge film temperature of 320° C. and at a line speed of 250 m/min and laminated onto the reverse surface of a paper substrate having a width of 3m and a mean weight of 169 g/$m^2$, and which had been treated by a corona discharge having an output of 17 kw. The resultant polyethylene resin layer had a thickness of 27 $\mu$m.

TABLE 2

| Composition | MFR (g/10 min.) | Density (g/$cm^3$) | Amount of Additives (wt %) |
|---|---|---|---|
| HDPE | 12 | 0.967 | 50 |
| LDPE | 3.5 | 0.923 | 50 |

Next, using a cooling roll having a surface matte roughness of 0.7 $\mu$m, a mixture of LDPE (the same as that in Table 2) and two types of pellets mixed in such a way as to produce the final composition shown in Table 4 was extruded at a line speed of 250 m/min. and laminated onto the top surface of a paper substrate at the side at which an image was formed so as to prepare a coating layer of the water-resistant resin. One of the types of the pellets thus mixed was master batch pellets of LDPE (the same as that in Table 2) and titanium dioxide, with the titanium dioxide having been treated with aluminum phosphate with respect to the titanium dioxide (0.05% by weight) and a silane coupling agent with respect to the titanium dioxide (1.0% by weight). The other type of pellets thus mixed was master batch pellets which included 5% of ultramarine blue. Thereafter, a corona discharge treatment having an output of 18 kw was administered to the top surface of the resultant laminate, and a corona discharge treatment having an output of 12 kw was administered to the reverse surface of the resultant laminate, and a support for recording sheet was thus formed. At this time, a titanium dioxide pigment applied by a silane coupling agent by a wet process treatment was used as described below.

TABLE 3

| Composition | Content (wt %) |
|---|---|
| LDPE (ρ = 0.921 g/$cm^3$) | 37.98 |
| $TiO_2$ | 60 |
| Zinc stearate | 2 |
| Antioxidant | 0.02 |

TABLE 4

| Composition | Amount of Additives (wt %) | Thickness (μm) | Resin temperature (° C.) |
|---|---|---|---|
| LDFE (ρ = 0.921 g/cm$^3$) | 67.7 | 28 | 326 |
| Titanium dioxide pigment | 30 | | |
| anatase-type $TiO_2$ | | | |
| surface treatment amount | | | |
| aluminum phosphate: 0.05 wt % | | | |
| silane coupling agent A: 1.0 wt % | | | |
| Zinc stearate | 2 | | |
| Ultramarine blue | 0.3 | | |

Production of the titanium dioxide pigment:

Anatase-type titanium dioxide having a mean particle diameter of 0.16 μm according to an electron microscope was prepared in an aqueous slurry of 300g/1 as the density of solids of the titanium dioxide. A predetermined amount of aluminum phosphate (see Table 4) was added to the slurry while the slurry was maintained at a temperature of 40° C., and then the titanium dioxide in the slurry is treated by the aluminum phosphate.

After the pH of the slurry was adjusted to 3, a silane coupling agent A to D was added to the slurry in a predetermined amount (see Table 4, and Examples and Comparative Examples described later) with respect to the weight of the titanium dioxide. The resultant slurry was then stirred and hydrolyzed.

Next, this slurry was heated to 80° C., stirred, and thereafter filtered and washed. The obtained cake of titanium dioxide was dried at 120° C. for 12 hours and ground by a jet mill, and a titanium dioxide pigment was obtained.

Example 2

A support for recording sheet was prepared in the same manner as in Example 1 except that the treatment amount of aluminum phosphate with respect to titanium dioxide was 0.1 wt %, and titanium dioxide was treated by the silane coupling agent B in an amount of 0.8 wt %.

Example 3

A support for recording sheet was prepared in the same manner as in Example 1 except that the treatment amount of aluminum phosphate with respect to titanium dioxide was 0.5 wt %, and titanium dioxide was treated by the silane coupling agent C in an amount of 0.8 wt %.

Example 4

A support for recording sheet was prepared in the same manner as in Example 1 except that the treatment amount of aluminum phosphate with respect to titanium dioxide was 1.0 wt %, and titanium dioxide was treated by the silane coupling agent D in an amount of 0.8 wt %.

Example 5

A support for recording sheet was prepared in the same manner as in Example 1 except that the treatment amount of aluminum phosphate with respect to titanium dioxide was 0.5 wt %, and titanium dioxide was treated by the silane coupling agent A in an amount of 0.5 wt %.

Comparative Example 1

A support for recording sheet was prepared in the same manner as in Example 1 except that the treatment amount of aluminum phosphate with respect to titanium dioxide was 0.01 wt %.

Comparative Example 2

A support for recording sheet was prepared in the same manner as in Example 1 except that the treatment amount of aluminum phosphate with respect to titanium dioxide was 1.5 wt %.

Comparative Example 3

A support for recording sheet was prepared in the same manner as in Example 1 except that, in place of aluminum phosphate, sodium aluminate and sulfuric acid were used to apply $Al_2O_3$ in an amount of 0.1 wt % with respect to titanium dioxide to the $TiO_2$ surface, and titanium dioxide was treated by the silane coupling agent A in an amount of 0.8 wt %.

Comparative Example 4

The support for recording sheet was prepared in the same manner as in Example 1 except that, in place of aluminum phosphate, sodium aluminate and sulfuric acid were used to apply $Al_2O_3$ in an amount of 0.5 wt % with respect to titanium dioxide to the $TiO_2$ surface, and then, the $TiO_2$ was sprayed with a methanol solution of trimethanol ethane while being ground by the jet mill.

Comparative Example 5

The support for recording sheet was prepared in the same manner as in Example 1 except that, in place of aluminum phosphate, sodium aluminate and sulfuric acid were used to apply $Al_2O_3$ in an amount of 0.5 wt % with respect to titanium dioxide to the $TiO_2$ surface and titanium dioxide was not treated by silane coupling agent.

The support for recording sheet thus obtained were examined with respect to film cracking traces and die-lip stripes during lamination of the water-resistant resin coating layer at the image printing side, sharpness of image, light fading resistence of the surface to be printed when exposed to sunlight. The results are shown in Table 5.

Evaluation standards are as follows:

◎: excellent level of production suitability or commercial value

○: good level of production suitability or commercial value

Δ: somewhat inferior level of production suitability or commercial value

X: no production suitability or commercial value

TABLE 5

| | Trace of film cracking | Occurrence of die-lip stripes | Image Sharpness | Light fading resistance |
|---|---|---|---|---|
| Example 1 | ◎ | ○ | ◎ | ○ |
| Example 2 | ◎ | ◎ | ◎ | ○-◎ |
| Example 3 | ◎ | ◎ | ◎ | ◎ |
| Example 4 | ◎ | ○ | ◎ | ◎ |
| Example 5 | ◎ | ◎ | ◎ | ◎ |
| Comp.Ex. 1 | ◎ | Δ | ◎ | X |
| Comp.Ex. 2 | Δ | X | ◎ | ◎ |
| Comp.Ex. 3 | ◎ | ○ | ◎ | Δ |
| Comp.Ex. 4 | ○ | X | ◎ | ○ |
| Comp.Ex. 5 | Δ | Δ | X | ○ |

As Table 5 clearly indicates, the support for recording sheet of the present invention exhibits either excellent or good levels of production suitability or commercial value with respect to each of the properties mentioned above. On the other hand, when conventional titanium dioxide is used, levels of production suitability or commercial value become either somewhat inferior or non-existent for at least one of the properties mentioned above.

As described above, in accordance with the present invention, it is possible to provide a support for recording sheet in which there is no film cracking, the occurrence of die-lip stripes is inhibited, which has excellent image sharpness, and in which excellent light fading resistance can be maintained.

What is claimed is:

1. A support for recording sheet comprising:

(a) a substrate having an image printing side and another side opposite the image printing side;

(b) a water resistant resin coating layer provided on each side of the substrate, at least the resin coating layer provided on the image printing side containing a titanium dioxide pigment, the titanium dioxide pigment including a titanium dioxide having a particulate surface treated by a silane coupling agent and aluminum phosphate in an aqueous slurry state, with a treatment amount of said aluminum phosphate with respect to said titanium dioxide being from 0.05 wt % to 1.2 wt %.

2. A support for recording sheet according to claim 1, wherein the treatment amount of said aluminum phosphate with respect to said titanium dioxide is 0.1 wt % to 0.8 wt %.

3. A support for recording sheet according to claim 1, wherein said silane coupling agent is at least one selected from compounds represented by the following formula (1):

$$(R^1)_n\text{—Si}(OR^2)_{4-n} \quad (1)$$

wherein, $R^1$ is a hydrocarbon group containing at least one of an alkyl group, a vinyl group, and a methacryl group, and which has no more than 10 carbons, $R^2$ is a methyl group or an ethyl group, n is an integer of 1 to 3, and if $n \geqq 2$, so that there is a plurality of $R^1$, each $R^1$ can be the same or different.

4. A support for recording sheet according to claim 1, wherein a treatment amount of said silane coupling agent with respect to said titanium dioxide is 0.05 wt % to 3.0 wt %.

5. A support for recording sheet according to claim 1, wherein the treatment amount of said silane coupling agent with respect to said titanium dioxide is 0.5 wt % to 2.0 wt %.

6. A support for recording sheet according to claim 1, wherein a mean particle diameter of the titanium dioxide is 0.1 to 0.4 μm.

7. A support for recording sheet according to claim 1, wherein at least said water-resistant resin coating layer provided on the image printing side further contains a blueing agent.

8. A support for recording sheet according to claim 1, wherein at least one of water-resistant resin coating layers provided on the image printing side is a layer containing the titanium dioxide pigment in an amount of 13 wt % or more.

* * * * *